United States Patent [19]

Aoki

[11] Patent Number: 5,272,621
[45] Date of Patent: Dec. 21, 1993

[54] METHOD AND APPARATUS USING FUZZY LOGIC FOR CONTROLLING A PROCESS HAVING DEAD TIME

[75] Inventor: Shigeaki Aoki, Kyoto, Japan

[73] Assignee: Nippon Denki Garasu Kabushiki Kaisha, Shiga, Japan

[21] Appl. No.: 433,827

[22] Filed: Nov. 9, 1989

[30] Foreign Application Priority Data

Nov. 18, 1988 [JP] Japan .................. 63-293200

[51] Int. Cl.⁵ .................... G06F 15/46; G05B 13/04
[52] U.S. Cl. ..................... 364/165; 364/160; 364/161; 364/177; 395/61; 395/900
[58] Field of Search .......... 364/120, 161, 162, 163, 364/164, 165, 177, 151, 148, 152; 395/61, 3, 900

[56] References Cited

U.S. PATENT DOCUMENTS

| | | | |
|---|---|---|---|
| 3,691,354 | 9/1972 | Green et al. | 364/161 |
| 4,257,105 | 3/1981 | Stewart et al. | 364/177 |
| 4,466,054 | 8/1984 | Shigemasa et al. | 364/162 |
| 4,602,326 | 7/1986 | Kraus | 364/160 |
| 4,639,853 | 1/1987 | Rake et al. | 364/162 |
| 4,669,040 | 5/1987 | Pettit et al. | 364/157 |
| 4,864,490 | 9/1989 | Nomoto et al. | 364/148 |
| 4,882,526 | 11/1989 | Iino et al. | 364/162 |
| 4,903,192 | 2/1990 | Saito et al. | 364/162 |
| 4,959,767 | 9/1990 | Buchner et al. | 364/157 |
| 4,992,927 | 2/1991 | Araki | 364/162 |

OTHER PUBLICATIONS

Kevin Anderson, Gilmer Blankenship, Lawrence Lebow; "A Rule-Based Adaptive PID Controller"; in *IEEE* 7, 1988; pp. 564–569.

H. R. vanNauta Lemke and Wang De-zhao; "Fuzzy PID Supervisor"; in *24th IEEE Conference on Decision and Control; Dec. 11–13, 1985; pp. 602–608.*

P. J. King and E. H. Mamdani; "The Application of Fuzzy Control Systems to Industrial Processes"; Sep. 15, 1976; pp. 235–241.

P. Martin Larsen; "Industrial Applications of Fuzzy Logic Control"; *Int. J. Man-Machine Studies* (1980) 12, 3–10; May 23, 1979; pp. 3–10.

"A Controller to Overcome Dead Time", Professor Otto J. M. Smith, ISA Journal, Feb. 1959, vol. 6, No. 2.

*Primary Examiner*—Joseph Ruggiero
*Attorney, Agent, or Firm*—Armstrong, Westerman, Hattori, McLeland & Naughton

[57] ABSTRACT

A method of controlling a process having dead time is disclosed. This method obtains input evaluating criteria for setting values of process response outputs in relation to known input information, the input evaluating criteria being represented in one or more of the integral, proportional and differential type process responses. Fuzzy inference is used to estimate a variation in the process response output occurring upon lapse of a dead time or a control amount relating thereto on the basis of the value of an input evaluating criterion. The process is subjected to fuzzy PI (proportional and integral) control based on the estimated value.

7 Claims, 10 Drawing Sheets

METHOD AND APPARATUS USING FUZZY LOGIC FOR CONTROLLING A PROCESS HAVING DEAD TIME

BACKGROUND OF THE INVENTION

1. Field of the Invention

The present invention relates to a method of process control such as for controlling the temperature of a glass melting furnace, which involves latency (dead time), i.e. a no-response period from a variation in the manipulated input till observation of its effect appearing as a variation in the process state.

2. Description of the Prior Art

When a stepwise manipulated input as shown in FIG. 13(a) is applied to a process involving a dead time, i.e. dead time process, a process response appears as a gradual variation after dead time L as shown in FIG. 13(b). In the PID control which does not take the dead time into account, a manipulated input varies as shown in FIG. 13(c), with a process response becoming vibrational as shown in FIG. 13(d). Such a phenomenon is called hunting which is an undesirable phenomenon well known in process control.

As will be appreciated, a dead time process is extremely difficult to control. Generally, therefore, this type of process control has been carried out by skilled operators. In recent years, a number of methods have been proposed for controlling a dead time process. The following are typical examples of such proposals.

One is the Smith method (O. J. M. Smith: Feedback Control System, McGraw-Hill Book Co., Inc., New York (1958), and O. J. M. Smith: ISA Jour., Vol. 1, No. 2 (1959)). Another is the state prediction method (Mitshuhiko Araki: "Control of Dead Time System and Nonlinear System", A Guideline to Control Engineering (Nippon Automatic Control Association), pages 139-162 (1985)). According to these methods, process characteristics are described in approximate equations, and future process behavior is predicted and controlled by referring to past manipulated inputs and observable process states.

Since process characteristics are represented by numerical expressions according to the Smith method and state prediction method as noted above, the characteristics of the process subjected to control must be grasped with high accuracy. Further, it is necessary for the process to be a linear process or a relatively simple nonlinear process which may be approximated with a plurality of linear processes.

However, the nature of an ordinary process is seldom grasped accurately although broadly recognized by experience. Besides, many processes have complex nonlinear characteristics.

Thus, the prior methods as noted above have the disadvantage of being hardly applicable to ordinary processes having nonlinear characteristics although useful in controlling special processes having linear characteristics.

SUMMARY OF THE INVENTION

The present invention has been made having regard to the above state of the art, and its object is to provide a process control method capable of controlling a nonlinear dead time process in a relatively simple manner and with high precision.

In order to achieve the above object, the invention provides a method of controlling a process involving a latency (dead time), i.e. a no-response period from a manipulated input variation till observation of an effect thereof appearing as a variation in a process state, the method comprising the steps of obtaining input evaluating criteria for setting values of at least empirically known process response outputs in relation to known input information given to the process, the input evaluating criteria being represented in one or more of the integral, proportional and differential type process responses, estimating, by fuzzy inference, a variation in the process response output occurring upon lapse of the dead time or a control amount relating thereto on the basis of the value of an input evaluating criterion, and subjecting the process to fuzzy PI (proportional and integral) control based on the estimated value.

Other features and advantages of the invention will be apparent from the following description.

BRIEF DESCRIPTION OF THE DRAWINGS

The drawings illustrate a process control method according to the present invention, in which.

DETAILED DESCRIPTION OF THE PREFERRED EMBODIMENT

[A] Concept of Dead Time

A basic concept of predicting behavior of a dead time process will be described first.

Figure 1A:
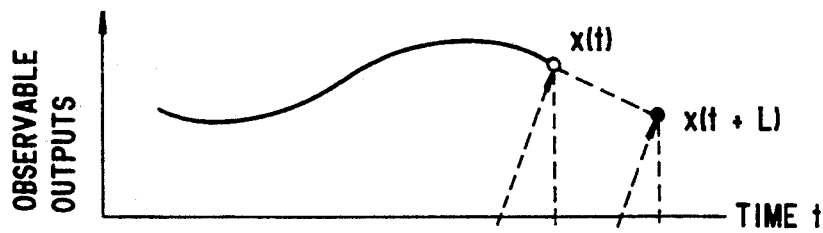
FIGS. 1a-1c are explanator views showing a basic concept for predicting behavior of a dead time process.
Figure 1B:
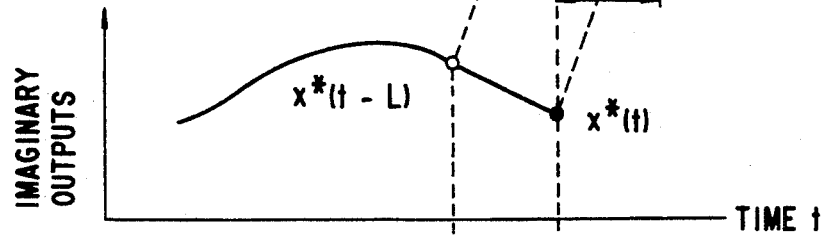
Figure 1C:
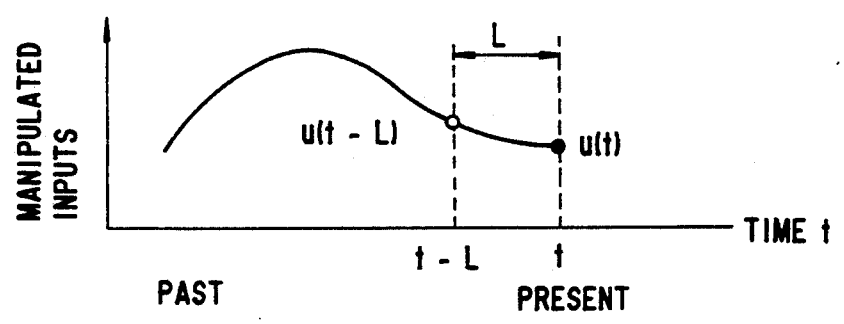
Figure 2A:
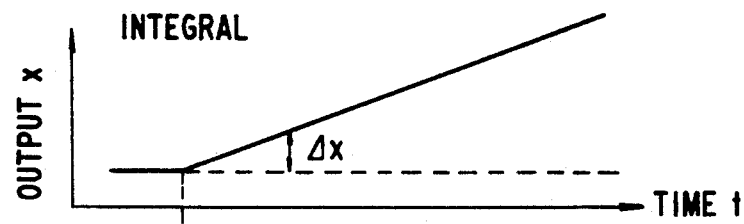
FIGS. 2a-2d are views showing basic response characteristics of the process.
Figure 2B:
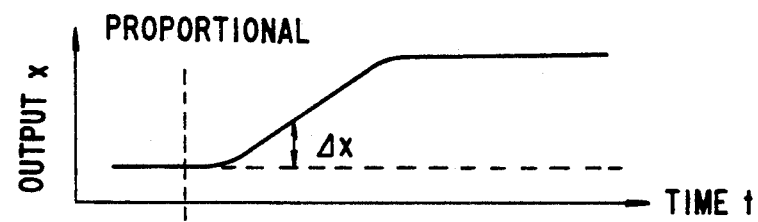
Figure 2C:
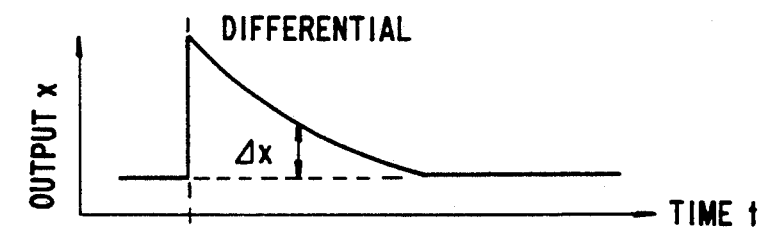
Figure 2D:
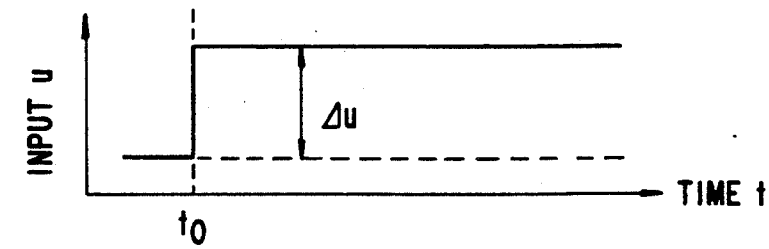

Referring to FIG. 1, regarding a dead time process, we can know a manipulated input time series {u(t)} applied to the process as shown in FIG. 1(c) and a process response output time series {x(t)} observable up to the present time as shown in FIG. 1(a). The observable process response output time series {x(t)} corresponds to an output of the process made in the past (hereinafter referred to as an imaginary output) retrogressive by dead time L.

That is, an observed value x(t) of the present time t=t corresponds to the imaginary output x*(t−L) made in the past retrogressive by dead time L. This was governed by a manipulated input series {u(ξ);ξ≦t−L} made up to the point of time in the past retrogressive by dead time L. Further manipulated input series {u(ξ); t−L<ξ≦t} have already been given to the process, and the imaginary output x*(t) for the present time has been determined. In other words, observable output series {x(ξ); t<ξ≦t+L} have also been determined.

Accordingly, the future observable value x(t) occurring after dead time L from now may be deduced from past observed series {x(ξ); ξ≦t} and manipulated input series {u(ξ); t−L<ξ≦t} made during the dead time L.

[B] Process Response Prediction

Future observation values x(t+L) will be output as a sum of past observed series {x(ξ); ξ≦t} and variations in the process output resulting from the manipulated input series {u(ξ); t−L<ξ≦t} made during the dead time L. Therefore, in order to estimate future observation values x(t+L), it is necessary to predict beforehand the way in which the process will behave (i.e. respond) in response to the manipulated inputs.

A basic concept of input evaluating criteria used for predicting process responses to various manipulated inputs (input information) will be described hereunder.

The basic characteristics of process response are considered first. An ordinary process generally is stable, and therefore the basic characteristics of process response may be said to be invariable. Further, judging from the process elements or from past findings, process responses are considered to be classified into one of the following three categories or a combination thereof.

(1) Integral Type Processes

These are the processes that show an integral type response to a manipulated input. They include a robot arm or vehicle moving process, for example.

(2) Proportional Type Processes

These are the processes that show a response proportional to a manipulated input, in which an input energy is diffused. They include a heating process, for example.

(3) Differential Type Processes

These are the processes that show a differential type response to a manipulated input.

FIG. 2 shows typical examples of process responses occurring when a stepwise variation is made as a manipulated input. FIG. 2(a) shows a response of an integral type process, FIG. 2(b) a proportional type process, and FIG. 2(c) a differential type process.

If the category to which the controlled process belongs is known, the process response occurring when a given manipulated input u(t) is made to the process may be predicted from the following equation which is obtained from a variation of convolutional integration:

$$x(t + L) - x(t) = \Delta x = \quad (1)$$

-continued $$G \int_{t-L}^{t} w(t - \tau)[u(\tau) - u(t - L)]d\tau +$$

$$G \int_{0}^{t} w(t - \tau) \cdot u'(\tau)d\tau - x(t)$$

where $$u'(\tau) = \begin{cases} u(\tau), & 0 < \tau \leq t - L \\ u(t - L), & t - L < \tau \leq t \end{cases}$$

where w(ξ) is an output (impulse output) occurring when the process is given delta function δ(ξ), ξ≧0 as an input, which is known beforehand in connection with the basic process of the integral, proportional or differential type, and G is a proportional constant.

[C] Operator Input Evaluation

Basically, process response to a given manipulated input is predictable by using equation (1) set out in section [B] above. However, the form of w(ξ) is often unknown in respect of the process which should be controlled. It is thus necessary to prepare simply and rationally criteria (input evaluating criteria) for predicting the manner in which a process output will respond to a manipulated input. A specific way of preparing such input evaluating criteria will be described next.

As described hereinbefore, the relation between input to a process and output of the process is considered the integral type, proportional type, differential type or a combination thereof. In this case, process behavior resulting from manipulated input series {u(ξ); t−L<ξ≦t} made during the dead time L, namely variation x in the process response output, is proportional to criterion P expressed by the following equation (2) which corresponds to the first term of equation (1):

$$P = \int_{t-L}^{t} w(t - \tau)[u(\tau) - u(t - L)]d\tau \quad (2)$$

Figure 3A:
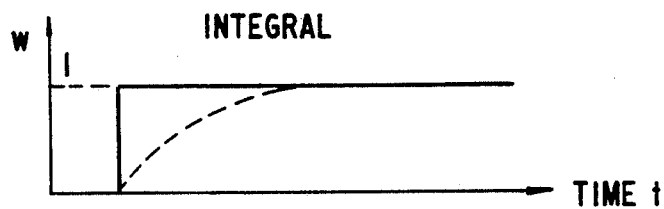
FIGS. 3a-3c are explanatory views of simplified impulse responses for forming input evaluating criteria.
Figure 3B:
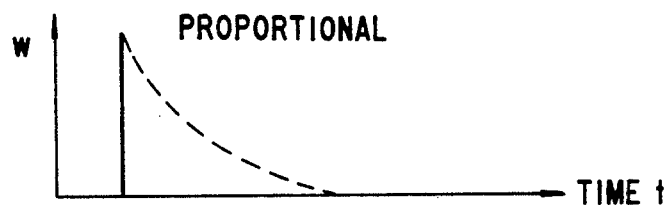
Figure 3C:
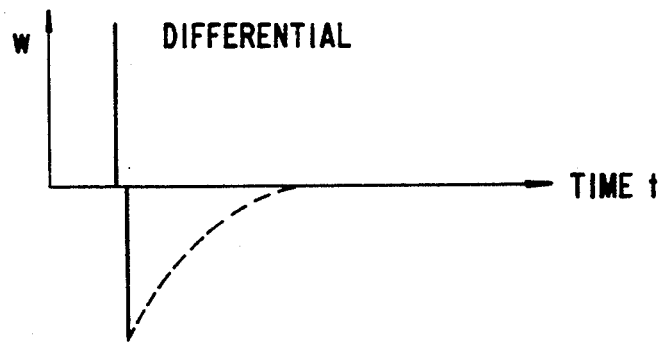

Delay (degree of energy diffusion) characteristic of impulse response w(ξ) is considered to influence dynamic characteristics of the process response but not static characteristics such as settling value of the process response. This is because the dead time of the process which generally is problematic is sufficiently longer than the delay in the impulse response w(ξ). Therefore, the delay characteristics of impulse response w(ξ) may be ignored, and it may be said rational to do so, in predicting process behavior appearing upon lapse of dead time L. The simplest forms of impulse response w(ξ) for the foregoing categories where no delay is involved are as shown in solid lines in FIG. 3. FIG. 3(a) shows the form of impulse response w(ξ) for the integral type process, FIG. 3(b) the proportional type, and FIG. 3(c) the differential type. The broken lines in FIG. 3 indicate the forms of response w(ξ) with a delay, for reference purposes. By applying these simplified forms of w(ξ) to equation (2), input evaluating criteria P applicable to the three process types may be expressed as follows:

(1) Integral Type:

$$Pi = \int_{t-L}^{t} [u(\tau) - u(t-L)]d\tau \qquad (3)$$

(2) Proportional Type:

$$Pp = u(t) - u(t-L) \qquad (4)$$

(3) Differential Type:

$$Pd = \int_{t-L}^{t} \left.\frac{du}{dt}\right|_{t=\tau} d\tau \qquad (5)$$

These input evaluating criteria govern variations occurring in the process response output upon lapse of dead time L. In other words, A variation appears in the process response output upon lapse of dead time L in a form substantially proportional to Pi, Pp, Pd or a combination thereof. Consequently, information for predicting the process response output occurring upon lapse of dead time L is obtained by determining input evaluating criteria of setting values in respect of all known inputs to the process such as measurable disturbances (e.g. nature and state of raw material, temperature, etc.) as well as the manipulated inputs.

It is difficult to assess the influences of unknown disturbances beforehand since their magnitude is unpredictable. The variation in process response output due to an unknown disturbance emerges as a control error. Needless to say, the manipulated input should be appropriately modified to eliminate it.

[D] Fuzzy Prediction

As will be clear from the foregoing description, variation $\Delta x$ in the process response output is proportional to input evaluating criterion P, i.e. $\Delta x = G \cdot P$, where G is the extent of contribution to the process response made by input evaluating criterion P. To estimate variation $\Delta x$ in the process response output, contribution coefficient G of input evaluating criterion P is defined.

A method of predicting the process response corresponding to the extent of the input evaluating criterion by fuzzy inference will be described hereinafter.

Consideration is made here of a dead time process with one input and one output. It is assumed that manipulated input u(t) is applicable with the proportional type input evaluating criterion P as expressed by the following equation:

$$P = \Delta u(t) = u(t) - u(t-L) \qquad (6)$$

Input evaluating criterion $P = \Delta u$ in the above equation (6) represents manipulated input series $\{u(\xi); t-L < \xi \le t\}$ made during the dead time L. Time differential $\dot{x}(t)$ represents the influences of manipulated input series $\{u(\xi); 0 < \xi < t-L\}$ made prior to the dead time L. The output variation $\Delta x$ occurring upon lapse of the dead time from now, i.e. the variation $\Delta x^*$ in the imaginary output of the present time, is now estimated by using the two kinds of information $\Delta u$ and $\dot{x}(t)$. If input variation $\Delta u$ has a positive influence on variation $\Delta x$ in the imaginary output, the following fuzzy inference rules may be provided:

Rule 1: If $\Delta u$ is positive big and $\dot{x}(t)$ is also positive big, then $\Delta x^*$ is positive big.

Rule 2: If $\Delta u$ is positive big and $\dot{x}(t)$ is positive small, then $\Delta x^*$ is positive medium.

Rule 3: If $\Delta u$ is positive big and $\dot{x}(t)$ is negative small, then $\Delta x^*$ is positive small.

Rule 4: If $\Delta u$ is positive big and $\dot{x}(t)$ is negative big, then $\Delta x^*$ is positive zero.

Figure 4B:
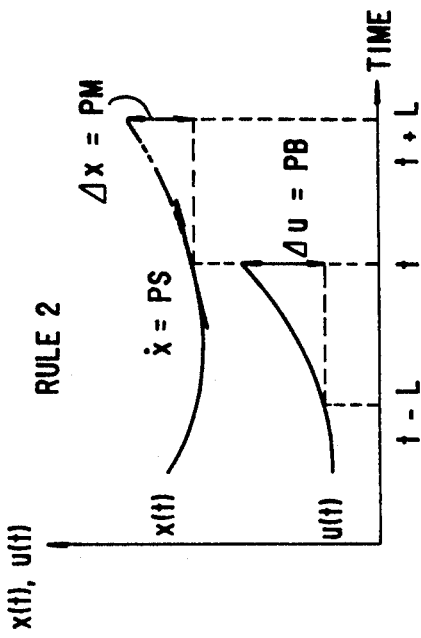
FIGS. 4a-4d are views showing manipulated inputs and process response characteristics for illustrating rules used for fuzzy inference.
Figure 4D:
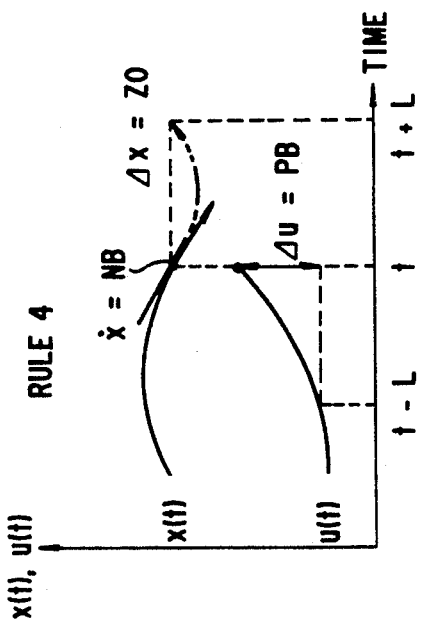
Figure 4A:
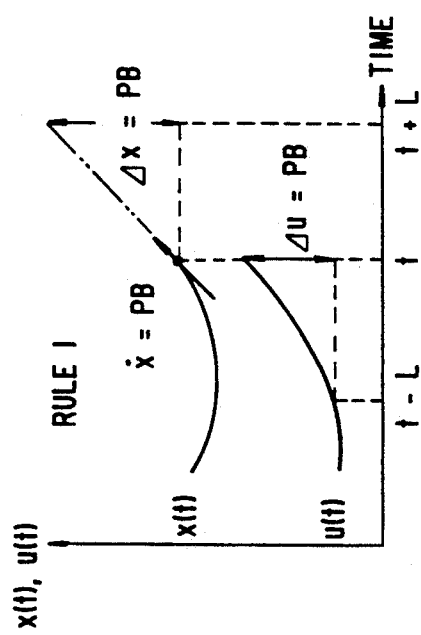
Figure 4C:
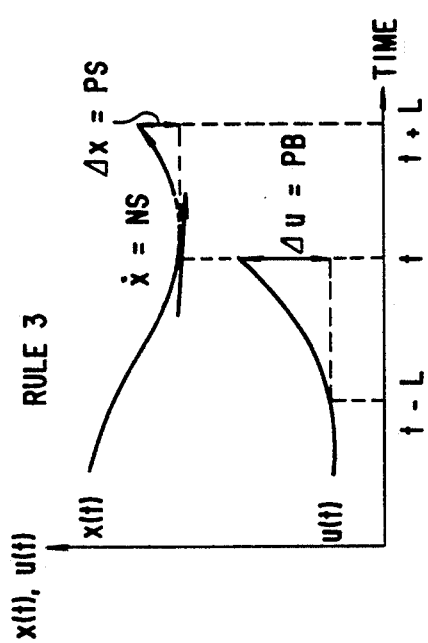

These four rules are for estimating variation $\Delta x^*$ in the imaginary output where input variation $\Delta u$ is positive big. FIG. 4 illustrates the respective rules in relation to input u(t) and behavior of imaginary output $x^*(t)$. FIG. 4(a) shows the behavior by rule 1, FIG. 4(b) by rule 2, FIG. 4(c) by rule 3, and FIG. 4(d) by rule 4.

Similar inference rules may be provided where input variation $\Delta u$ is positive medium, positive small, negative big, negative medium and negative small.

Figure 5:
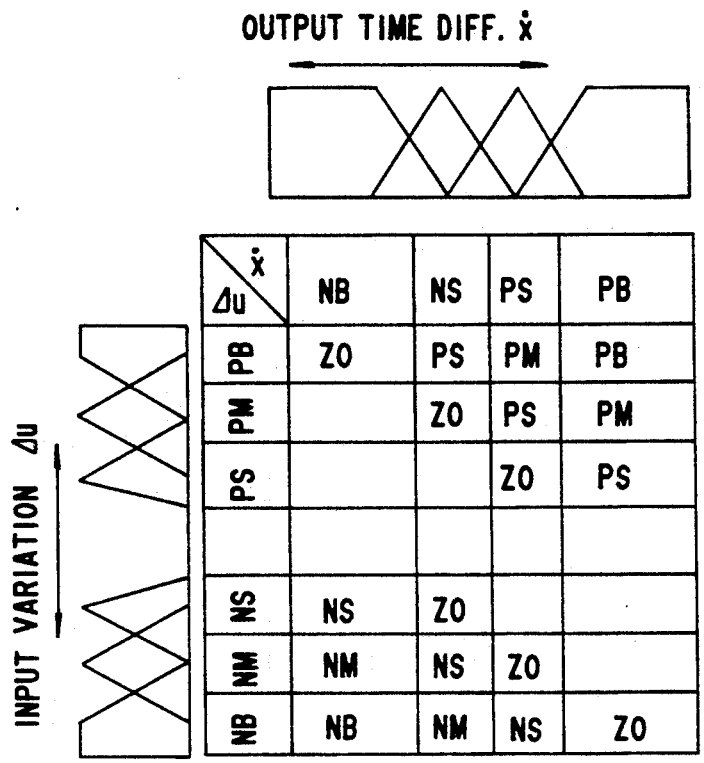
FIG. 5 is a table of rules for estimating variations in the imaginary output.

FIG. 5 shows a table of all rules for estimating variation $\Delta x^*$ in the imaginary output. The columns of this rule table show the values of input variation $\Delta u$, while the rows show the values of process output time differential $\dot{x}(t)$. The respective frames in the table show conclusions drawn from the conditions given in the columns and rows, namely the values of variations in the imaginary output (output variations $\Delta x$ occurring upon lapse of dead time L from now). The columns and rows in FIG. 5 are associated with membership functions $\mu i(\dot{x})$ and $\mu j(\Delta u)$ for defining the values of $\Delta u$ and $\dot{x}(t)$.

The Mandani method as set out in the following general expression may be used for reasoning variation $\Delta x^*$ in the imaginary output based on the above reasoning rules:

$$\mu(\Delta x^*, P) = \overset{n1}{\underset{i=1}{V}} \left\{ \underbrace{\overset{c1(j)}{\underset{j=1}{\wedge}} \mu ij(Pj)}_{\textcircled{1}} \wedge \mu i(\Delta x^*) \right\} \qquad (7)$$

$\underbrace{\phantom{xxxxxxxxxxxxxxxxxxxxxxxxxxxxxxxx}}_{\textcircled{2}}$ $\underbrace{\phantom{xxxxxxxxxxxxxxxxxxxxxxxxxxxxxxxxxxxxxxxxxxx}}_{\textcircled{3}}$ In the above equation:

Pj is the input evaluating criterion used for the jth condition in the ith rule, $\mu ij(Pi)$ is the jth membership function of AND-coupled conditions included in the ith rule, C1(i) is the number of AND-coupled conditions included in the ith rule, $\mu i(\Delta x^*)$ is the membership function of the conclusion for the ith rule, n1 is the total number of rules, and $\mu(\Delta x^*, P)$ is the membership function showing the result of reasoning of imaginary output $\Delta x^*$ composed by all the rules.

The portion ① in the right side of equation (7) signifies that the logical AND is taken of the conditions included in one rule. The portion ② signifies that the logical AND is taken of the conclusions corresponding to a plurality of conditions in one rule. The portion ③ signifies that the logical OR is taken of the conclusions corresponding to a plurality of rules.

The result of estimation $\mu(\Delta x^*, P)$ of the variation in the imaginary output derived from equation (7) is not expressed unequivocally but ambiguously. Where the variation in the imaginary output needs to be made definite for process control, an unequivocal estimated value $\Delta \dot{x}^*$ of variation in the imaginary output may be derived from defuzzification called the center of gravity method as expressed by the following equation:

$$\Delta \hat{x}^* = \frac{\int \Delta x \xi \cdot \mu(\xi, P) d\xi}{\int \Delta x \mu(\xi, P) d\xi} \quad (8)$$

[E] Fuzzy Control

A method of effecting fuzzy control on a process by using a value of variation in the imaginary output estimated through fuzzy inference will be described here.

The estimated value $\Delta \hat{x}^*$ of variation in the imaginary process output is equal to the estimated value $\Delta \hat{x}$ of response output variation of the process occurring upon lapse of dead time L from now. It is therefore possible to consider control of a process having no dead time by using the estimated value $\Delta \hat{x}^*$ of variation in the imaginary output.

In the case of ordinary control, the output variation in the process under control is a definite value. On the other hand, in the process control method according to the present invention, the output variation in the process under control is an indefinite value, and fuzzy PI control is employed herein which is suited to fuzzy control, particularly to process control.

In ordinary PI control, a manipulated input is expressed by the following equation:

$$u = KP \cdot e + KI \cdot \int e \, dt \quad (9)$$

where e is a process output deviation expressed by $\gamma - x$ (in which $\gamma$ is a target value or reference and x is a process response output), and KP and KI are evaluation coefficients.

The following equation expresses time differential in equation (9) and is called a velocity expression.

$$\dot{u} = KP \cdot \dot{e} + KI \cdot e \quad (10)$$

In ordinary PI control, evaluation coefficients KP and KI are treated as constants and are therefore hardly applicable to a nonlinear process.

In fuzzy PI control, on the other hand, output deviation e and its variation rate (time differential) $\dot{e}$ are used as in the above velocity expression. However, the evaluation coefficients are freely variable according to e and $\dot{e}$, and therefore variation $\dot{u}$ in the amount of control may be expressed non-linearly with ease.

Output deviation e(t+L) occurring upon lapse of dead time L from now and its variation rate $\dot{e}$(t+L) are estimated based on the estimated variation $\Delta \hat{x}$ in the response output occurring upon lapse of dead time L from now. These data are connected in series or in parallel to a fuzzy PI controller for controlling the process, which will be described hereinafter.

(1) Serial Connection to Fuzzy PI Control

The estimated value $\Delta \hat{x}^*$ of variation in the imaginary process output derived from equation (8), i.e. the estimated value $\Delta \hat{x}$ for the point of time in the future the dead time L from now, is a provisional definite value obtained from an indefinite reasoning result. In other words, information might have been lost in the process of obtaining $\Delta \hat{x}^*$ from the estimated value $\mu(\Delta x^*, P)$ of variation in the imaginary output having a spatial expanse as expressed by equation (7). To avoid such information loss, the result of inference $\mu(\Delta x^*, P)$ preceding the defuzzification is used here.

Estimation of Output Deviation

First, output deviation e(t+L) is estimated. The estimated value $\Delta x^*$ of variation in the imaginary output is equal to the estimated value $\Delta x$ of variation in the output occurring upon lapse of dead time L from now. Accordingly, the value $\Delta x$ is used in the following description.

Estimated value $\Delta \hat{x}$ of variation in the process output occurring upon lapse of dead time L from now is expressed by the following equation:

$$\Delta \hat{x} = \hat{x}(t+L) - x(t) \quad (11)$$

If target value $\gamma$ remains the same till time L from now, equation (11) may be changed as follows:

$$\Delta \hat{x} = -(\gamma - \hat{x}(t+L)) + (\gamma - x(t)) \quad (12)$$

Therefore, output deviation $\hat{e}$(t+L) occurring upon lapse of dead time L from now is expressed by the following equation:

$$\hat{e}(t+L) = e(t) - \Delta \hat{x} \quad (13)$$

Thus, the membership function of deviation $\hat{e}$(t+L) of the time t+L is expressed by the following equation:

$$\mu(\hat{e}(t+L)) = \bigvee_{e(t) - \Delta \hat{x} = \hat{e}(t+L)} \mu(e(t)) \wedge \mu(x, P) \quad (14)$$

In the above equation (14), $\mu$(e(t)) is a membership function of definite value e(t). Therefore, $$\mu(\xi) = \begin{cases} 1, & \xi = e(t) \\ 0, & \xi \neq e(t) \end{cases} \quad (15)$$

Thus, the membership function of $\hat{e}$(t+L) is expressed by the following equation:

$$\mu(\hat{e}(t+L)) = \mu(e(t) - \Delta \hat{x}, P) \quad (16)$$

Estimation of Variation Rate

Next, the variation rate of the output deviation occurring upon lapse of dead time L from now is estimated.

Process deviation e(t)=$\gamma$-x(t). If target value $\gamma$ varies more slowly than x(t), its time variation rate is as follows:

$$\dot{e}(t) = -\dot{x}(t) \quad (17)$$

If process behavior is smooth and curvature variation constant, the process behavior may be expressed by the following quadratic equation:

$$x(t) = At^2 + Bt + C \quad (18)$$

Unknown quantity x(t+L) is derived here from the following equation by using (t, x(t), $\dot{x}$(t)) and (t+L, $\hat{x}$(t+L), $\dot{\hat{x}}$(t+L)):

$$\dot{\hat{x}}(t+L) = 2\frac{\Delta \hat{x}}{L} - \dot{x}(t) \quad (19)$$

Thus, the membership function of $\hat{x}(t+L)$ is expressed by the following equation:

$$\mu(\hat{\hat{e}}(t+L)) = \mu\left(\dot{x} - 2\frac{\Delta\hat{x}}{L}, P\right) \qquad (20)$$

Figure 6:
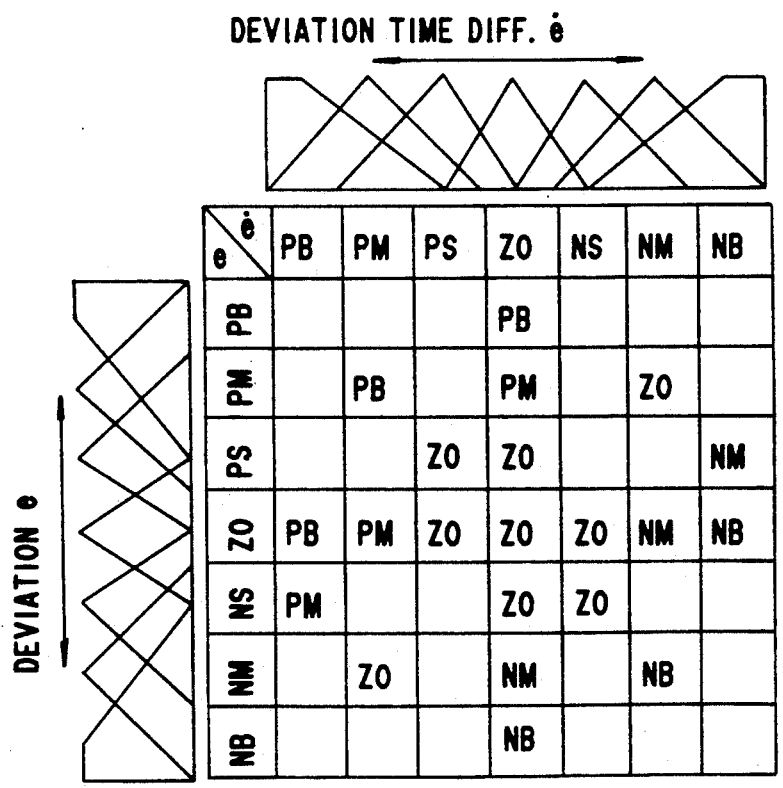
FIG. 6 is a table of rules for estimating control outputs for deviation compensation in fuzzy PI control.

Control output $\Delta u$ is obtained by using deviation $\mu(e(t+L))$ and variation rate $\mu(\dot{e}(t+L))$ derived from above. Fuzzy PI control rules generally used and their membership functions may be used here as they are. FIG. 6 shows an example of table of fuzzy PI control rules for estimating control output $\Delta u$ for deviation correction from deviation $e$ and its time differential $\dot{e}$. The columns of this rule table show values of deviation $e(t+L)$ while the rows show values of deviation time differential $\dot{e}(t+L)$, together with their membership functions $\mu i(e)$ and $\mu j(\dot{e})$. The respective frames in the table show conclusions drawn from the conditions given in the columns and rows, namely the values of variations in the control output (manipulated input).

Variations $\Delta u$ in the control output based on such inference rules may be estimated by the following equation:

$$\mu(\Delta u) = \bigvee_{i=1}^{nc}\left(\left[\bigwedge_{j=1}^{mc(i)}\begin{matrix}e & c & u \\ (\mu ij \wedge \mu ij) \wedge \mu i\end{matrix}\right]\right) \qquad (21)$$

In the above equation:

$$\begin{matrix}e\\ \mu ij\end{matrix}$$

is the result of deviation estimation $\mu(\dot{e})$ or $\mu(e)$ used for the jth condition included in the ith control rule, $$\begin{matrix}c\\ \mu ij\end{matrix}$$

is the membership function of the jth condition included in the ith control rule, mc(i) is the number of AND-coupled conditions included in the ith control rule, $$\begin{matrix}u\\ \mu i\end{matrix}$$

is the membership function of the conclusion included in the ith control rule, nc is the total number of control rules, and $\mu(\Delta u)$ is the membership function showing the result of estimation of control output $\Delta u$ composed by all the conditions.

Figure 7:
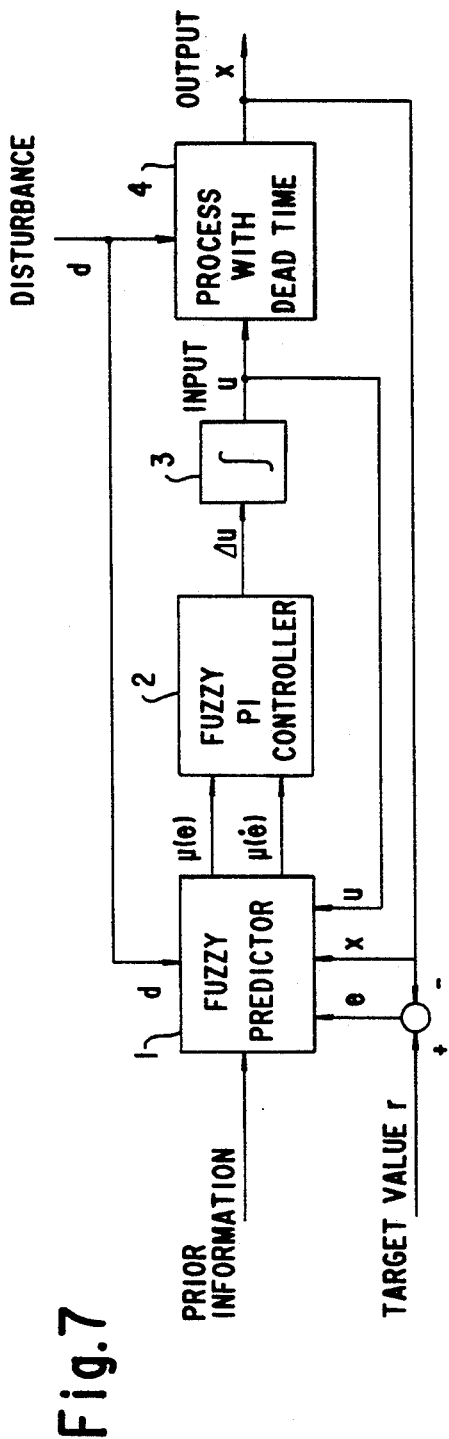
FIG. 7 is a block diagram of a control system in which results of process response estimation are connected in series to the fuzzy PI control.

FIG. 7 is a block diagram showing the process control described above, i.e. the process control wherein the estimated output deviation $\mu(e(t+L))$ and time differential $\mu(\dot{e}(t+L))$ of the output deviation are connected in series to a fuzzy PI controller.

The foregoing process control will be described in sum hereunder with reference to FIG. 7.

A fuzzy predictor 1 predicts process output variation $\Delta x$ corresponding to the value of input evaluating criterion and occurring upon lapse of dead time L from now, by fuzzy inference based on manipulated input u, process response output x, known disturbance d and other prior information. The table as shown in FIG. 5 has been made available for the inference. On the basis of this table, process output variation $\Delta x$ occurring upon lapse of dead time L from now is predicted by the Mandani method, for example. Output deviation $e(t+L)$ occurring upon lapse of dead time L from now and its time differential $\dot{e}(t+L)$ are estimated on the basis of the obtained inference result $\Delta x$ and the current output deviation $e(e=\gamma-x)$.

A fuzzy PI controller 2 receives from the fuzzy predictor 1 the result of inference $\mu(e(t+L))$ of the output deviation occurring dead time L from now and its time differential $\mu(\dot{e}(t+L))$, and estimates control output variation $\Delta u$ for deviation correction. The table of rules as shown in FIG. 6 has been made available for the inference.

An integrator 3 integrates control output variation $\Delta u$ received from the fuzzy PI controller 2, and outputs resulting manipulated input u to the process having dead time.

In this way, the process having dead time L is controlled to provide response output x agreeing with target value $\gamma$.

(2) Parallel Connection to Fuzzy PI Control

This will be described with reference to FIG. 9.

Figure 9:
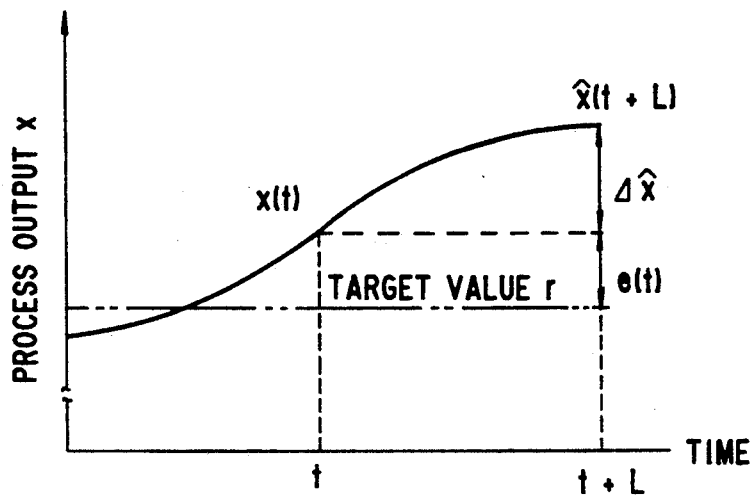
FIG. 9 is a view of process response characteristics for illustrating the fuzzy PI control of the parallel connection system shown in FIG. 8.

FIG. 9 shows behavioral characteristics of process output x. It is assumed that the current process output is $x(t)$ with deviation $e(t)$ from target value $\gamma$. Further, it is assumed that manipulated input $\{u(\xi); t-L<\xi\leq t\}$ made during dead time L up to now causes the process output to show variation $\Delta \hat{x}$ from the current process output $x(t)$ upon lapse of dead time L from now, whereby the process output becomes $\hat{x}(t+L)$. Therefore, in order to approximate the process output occurring dead time L from now to target value $\gamma$, compensation may be made for a deviation corresponding to a sum of deviation $e(t)$ and variation $\Delta \hat{x}$.

Figure 8:
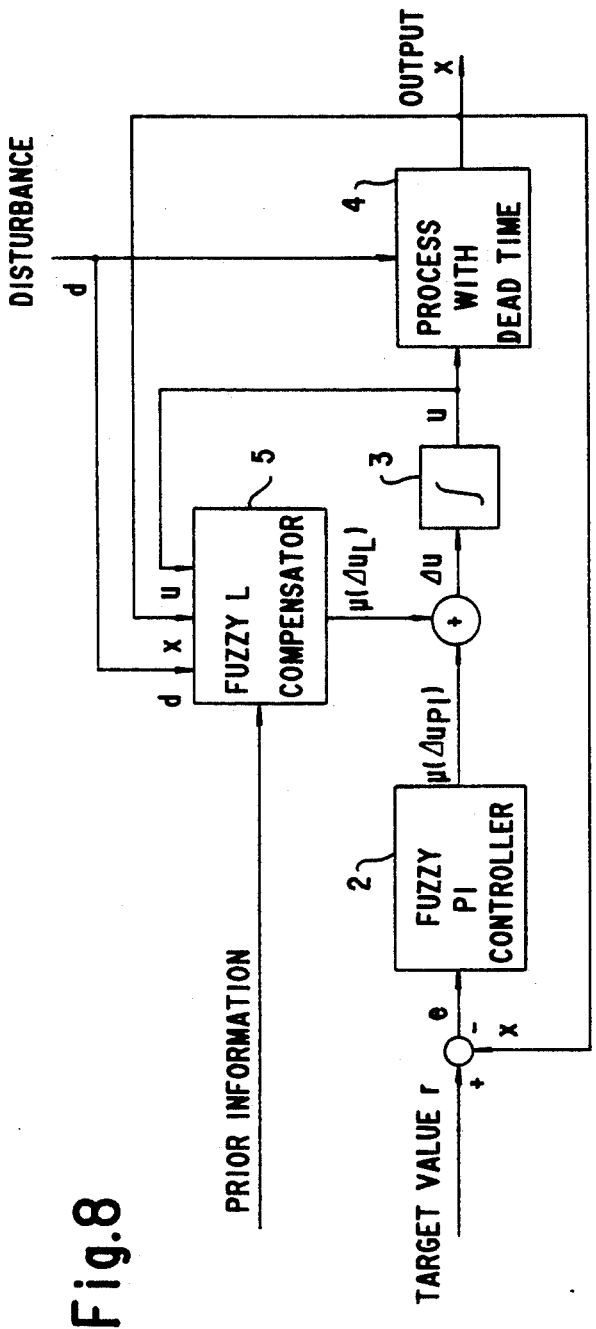
FIG. 8 is a block diagram of a control system in which results of process response estimation are connected in parallel to the fuzzy PI control.

In the parallel connection to the fuzzy PI control, as shown in FIG. 8, the fuzzy PI controller 2 infers control amount $\Delta u_{PI}$ to compensate for the current process output variation $e(t)$, while a fuzzy L compensator 5 infers control amount $\Delta u_L$ to compensate for variation $\Delta \hat{x}$ of the process response based on manipulated input u and other process inputs. Results of such inference are added to produce control output u to compensate for the deviation occurring upon lapse of dead time L from now, which is applied to the process 4 having a dead time.

This parallel connection method will particularly be described next.

When input information such as manipulated input u and process output x are given, an estimated value $\Delta \hat{x} = \hat{x}(t+L)-x(t)$ of variation in the process response corresponding to the value of the input evaluating criterion and occurring upon lapse of dead time L from now may be obtained by using the table of rules shown in FIG. 5.

If this response variation $\Delta \hat{x}$ is obtained, it more or less comes to our knowledge what extent of manipulated input variation $\Delta u_L$ should be applied for compensation purposes. If their relation is constant, $\Delta u_L$ is given by the following equation:

$$\Delta u_L = -K \cdot \Delta \hat{x} \qquad (22)$$

To more accurately express the relation between $\Delta u_L$ and $\Delta \hat{x}$, the function of a high-order equation regarding $\Delta \hat{x}$ as shown hereunder may be utilized.

$$\Delta u_L = f(\Delta \hat{x}) \tag{23}$$

A proper value may be obtained for $\Delta u$ also by the following fuzzy inference:

$$\mu(\Delta u_L) = \bigwedge_{i=1}^{mu} \{(\mu(\Delta x) \wedge \mu i) \wedge \mu i(\Delta u)\} \tag{24}$$

where $\mu i$ is the membership function of $\Delta x$ in the ith rule, $\mu i(\Delta u)$ is the membership function of $\Delta u$ of the conclusion of the ith rule, and mu is the number of rules for inference $\Delta u$. The provisional definite value $\Delta u_L$ is derived from the following equation:

$$\Delta u_L = \frac{\int \Delta u \xi \cdot \mu_L(\xi) d\xi}{\int \Delta u \mu_L(\xi) d\xi} \tag{25}$$

Operator input variation $\Delta u_L$ obtained as above suppresses estimated value $\Delta x$ of the response variation observable upon lapse of dead time L from now. $\Delta u_L$ is a fuzzy number which may be expressed in functions as set out hereunder. Equation (26) expresses the membership function corresponding to equation (22), equation (27) the function corresponding to equation (23), and equation (28) the function corresponding to equation (24).

$$\mu(\Delta u_L) = \mu(-K\Delta x, P) \tag{26}$$

$$\mu(\Delta u_L) = \mu(-f(\Delta x), P) \tag{27}$$

$$\mu(\Delta u_L) = \bigwedge_{i=1}^{mu} \{(\mu(\Delta x, P) \wedge \mu i) \wedge ui(\Delta u_L)\} \tag{28}$$

The fuzzy L compensator 5 shown in FIG. 8 carries out the above inference of $\mu(\Delta u_L)$.

On the other hand, the fuzzy PI controller 2 carries out the inference of control input variation $\Delta u_{PI}$ to compensate for variation $e(t)$ in the process response. The compensation effected here is an ordinary fuzzy PI control, and is not particularly described.

The sum of $\mu(\Delta u_{PI})$ and $\mu(\Delta u_L)$ inferred as above becomes the membership function of the control output (manipulated input) taking into account the behavior of the process output occurring upon lapse of dead time L from now. The following equation represents this membership function.

$$\mu(\Delta u) = \bigwedge_{\Delta u_L + \Delta u_{PI} = \Delta u} \{\mu(\Delta u_L) \wedge \mu(\Delta u_{PI})\} \tag{29}$$

Figure 10:
FIG. 10 is a table of rules for estimating compensating control inputs in the fuzzy PI control of the parallel connection system.

The fuzzy L compensator 5 infers output response variation $\Delta \hat{x}$ occurring upon lapse of dead time L from now, from manipulated input variation $\Delta u$ and output time differential $\dot{x}$, and infers therefrom manipulated input variation $\mu(\Delta u_L)$ for compensation purposes. Where a direct prediction of manipulated input variation $\Delta u_L$ is possible without the knowledge of output response variation $\Delta \hat{x}$, a table of rules as shown in FIG. 10 may be used instead of the table of rules shown in FIG. 5. The table of FIG. 10 aids in direct inference of $\Delta u_L$ for dead time compensation from manipulated input variation $\Delta u$ and output time differential $\dot{x}$.

As will be understood from the foregoing description, the process control method according to the present invention obtains input evaluating criteria for settling of at least empirically known process response outputs in relation to known input information given to the process, the input evaluating criteria being represented in one or more of the integral, proportional and differential type process responses. Fuzzy inference is used to estimate a variation in the process response output occurring upon lapse of dead time or a control amount relating thereto on the basis of the value of an input evaluating criterion. The process is subjected to fuzzy PI (proportional and integral) control based on the estimated value. Thus, the method according to the present invention is capable of controlling, in a stable manner and with high precision, all processes having dead time, whether they have linear characteristics or complex nonlinear characteristics. The invention allows this type of process control to be automated with ease, which has been difficult heretofore.

The process control method according to the present invention will be described further as applied to temperature control of a glass melting furnace.

Construction of Glass Melting Furnace

Figure 11:
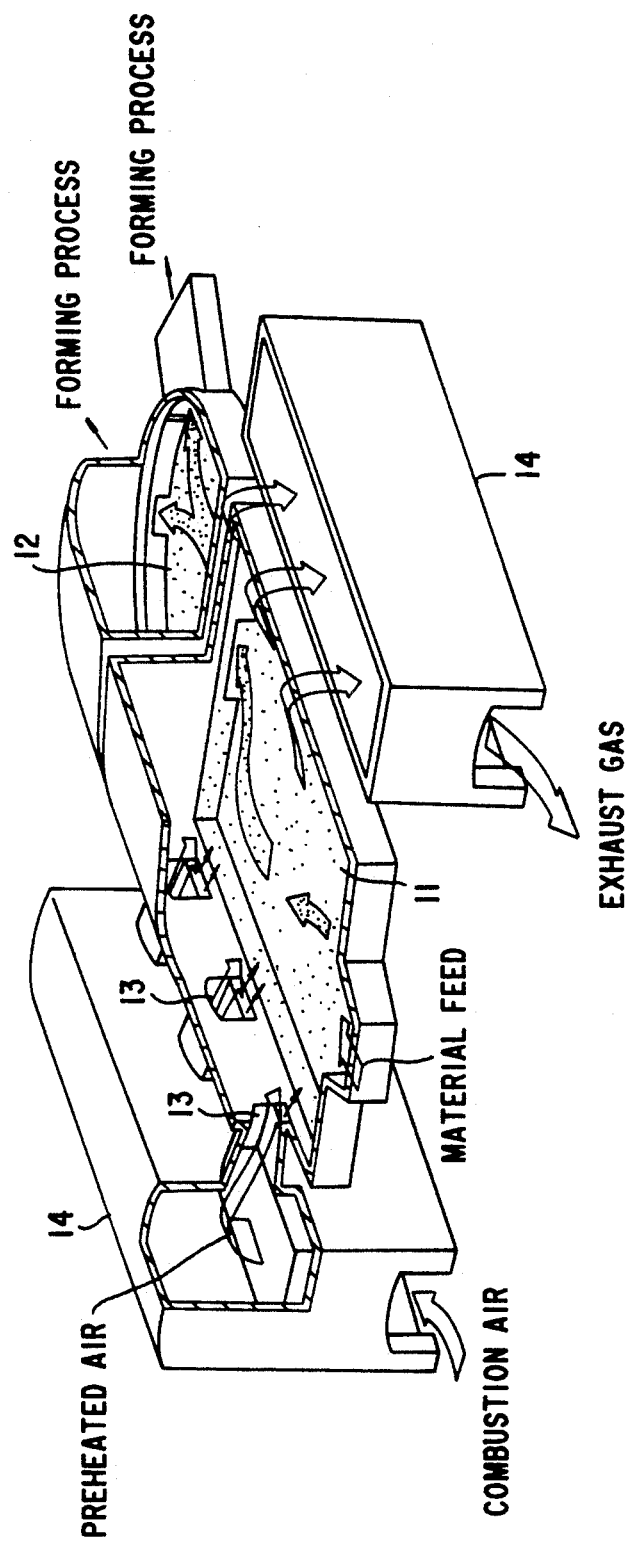
FIG. 11 is a perspective view, partly broken away, of a glass melting furnace to which the method of the present invention is applicable.

FIG. 11 is a perspective view, partly broken away, showing the construction of a glass melting furnace to which this invention is applied.

The illustrated glass melting furnace comprises two chambers formed of fire bricks, i.e. a melter 11 for heating a mixture of glass raw materials to a high temperature, and a refiner 12 for adjusting temperature of glass melt flowing in from the melter 11. The mixture of glass raw materials such as silica sand, alumina and so on is fed into the melter 11 through one end thereof. The temperature-controlled molten glass is transferred from the refiner 12 to a forming process.

The glass melting furnace has ports 13 in both side walls thereof for supplying fuel and combustion air. The material mixture is heated by burning heavy oil or natural gas supplied through the ports 13 to an upper space of the melter 11.

When the ports 13 located in one side wall of the melter act as combustion ports, the ports 13 in the other lateral wall act as combustion gas exhaust ports. Thus the functions of the ports 13 in both side walls are interchangeable. This enables an effective use of regenerators 14 acting as heat recovering devices of the glass melting furnace.

The glass melting furnace includes thermocouples or radiation thermometers (not shown) mounted on the ceiling, bottom and side walls thereof for measuring the temperature inside the furnace.

The glass melting furnace has a huge heat capacity, and requires as long a time as ten-odd hours for changing its thermal conditions. The temperature at the furnace bottom is affected by molten glass flows, and shows typical dead time behavior. Further, thermal characteristics of the glass melting furnace are greatly variable with many factors including the load applied to the melting furnace, state of the material mixture, surface state of molten glass, and color of glass.

Because of such peculiarity of the thermal characteristics and because of periodic temperature variations due to combustion reversal, it has been extremely difficult to control temperature of the glass melting furnace with conventional control methods.

Object of Control in Embodiment

The object to be controlled was set as follows in applying the present invention to the above glass melting furnace.

The temperature (x° C.) at the ceiling of the melting furnace near a material feed side was used as a control parameter (process output), and the supply rate (ul/hr.) of heavy oil for combustion as operating parameter (manipulated input).

The thermal characteristics of the temperature at the ceiling near the material feed side used as the control point are known through furnace operating data analysis to be capable of being approximated to a system having a dead time of about five hours. Further, these temperature characteristics are known to vary with operating conditions such as glass pull (load) and the state of the material mixture. Thus, the respective input evaluating criteria were determined by using such known input information as prior information.

This embodiment used the fuzzy PI control with the parallel connection as shown in FIG. 8, the table of rules as shown in FIG. 10 as the rules for the dead time compensation by the fuzzy L compensator 5, and the table of rules as shown in FIG. 6 as the rules for the deviation compensation by the fuzzy PI controller 2.

Effect of Embodiment

Figure 12A:
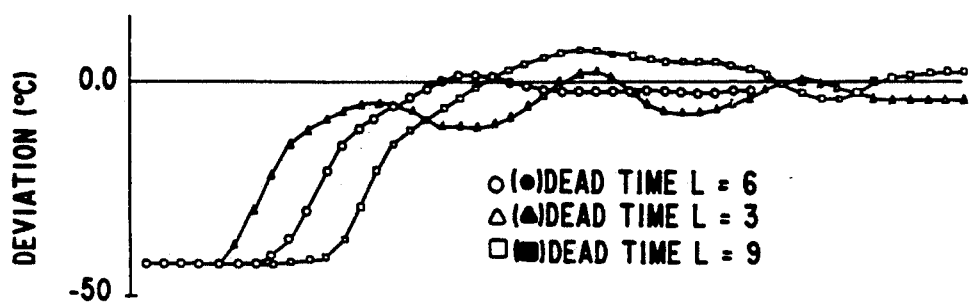
FIGS. 12a and 12b are diagrams simulating variations in the temperature deviation and heavy oil rate in the glass melting furnace under control of the present invention.
Figure 12B:
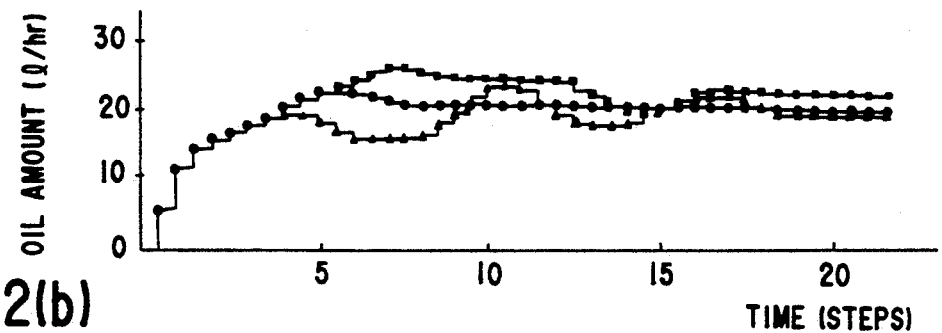
Figure 14A:
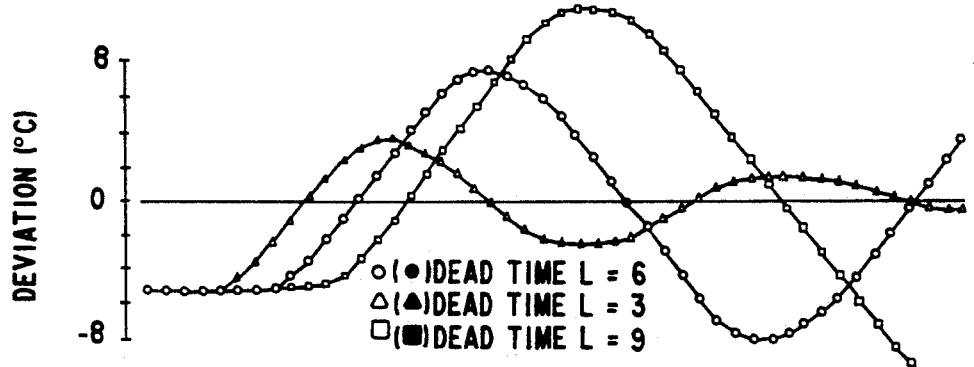
FIGS. 14a and 14b are diagrams simulating, for purposes of comparison with FIG. 12, variations in the temperature deviation and heavy oil rate in the glass melting furnace under the conventional PID control.
Figure 14B:
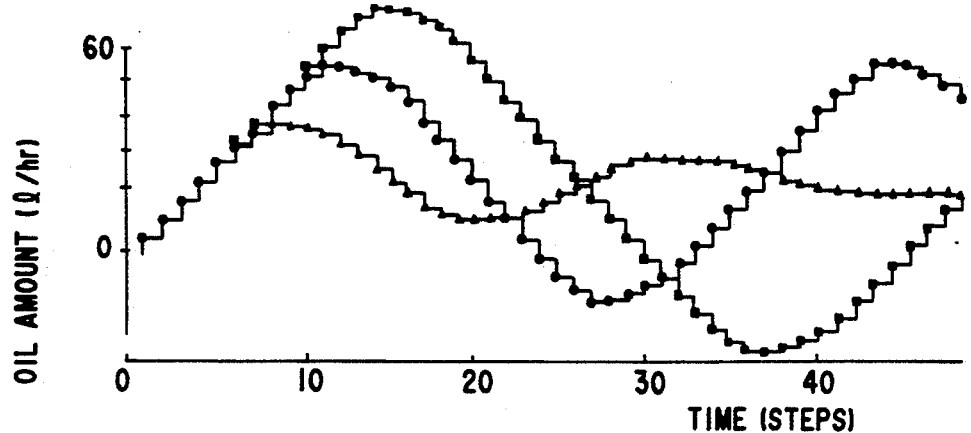
Figure 13A:
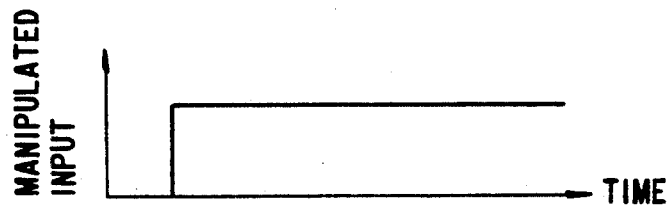
FIGS. 13a-13d are views showing process response characteristics where a stepwise manipulated input is applied to a dead time process, and characteristics of conventional PID control.
Figure 13B:
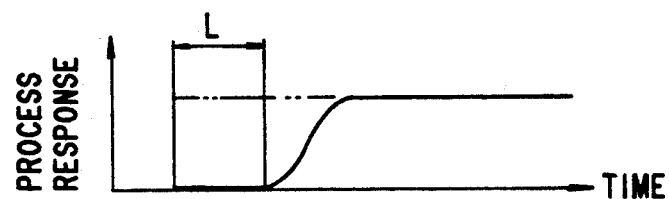
Figure 13C:
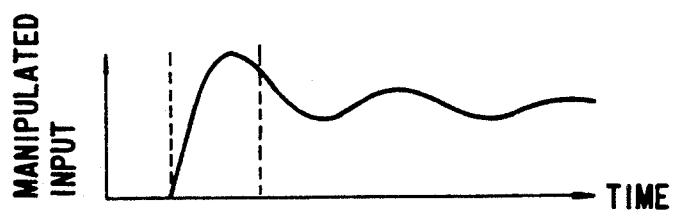
Figure 13D:
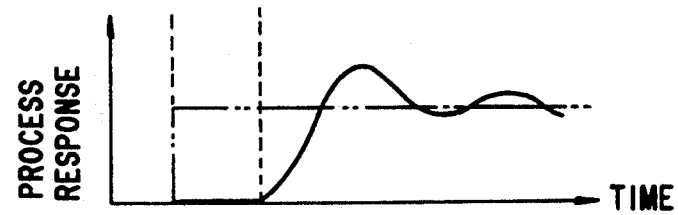

FIG. 12 shows results of control simulation of this embodiment. FIG. 12(a) is a diagram showing results of simulating temperature control, while FIG. 12(b) a diagram showing results of simulating variation in the oil amount. FIG. 14 shows, for comparison purposes, results of simulation where conventional PID control is applied.

As is clear from a comparison between FIG. 12 and FIG. 14, the control method of this embodiment is capable of effectively damping variations in the temperature deviation.

Other Applications

The present invention is applicable not only to temperature control of the glass melting furnace as described above but to various processes having dead time as follows:

For example:

(1) Sintering process in the steel industry for manufacturing sintered ore which are the main raw material for the blast furnace.

(2) Gas or liquid supplying process such as for supplying town gas or other fluid under a constant delivery pressure.

(3) Material blending process in the cement industry.

(4) Process of shaping glass pipes, steel pipes or the like.

(5) Process of shaping glass plates, steel plates or the like.

The invention is applicable to all the other processes that may be treated as approximating to dead time processes.

What is claimed is:

1. A method of controlling a process involving a latency or non-response period from a manipulated input variation until observation of an effect thereof appearing as a variation in a process state, said method comprising the steps of:

obtaining input evaluating criteria corresponding to settling values of at least empirically known process response outputs in relation to known input information relating to the process, the input evaluating criteria being represented by at least one of integral, proportional and differential type process responses;

estimating, by fuzzy inference, a variation in the process response output occurring upon lapse of the dead time on the basis of the value of said input evaluating criteria; and subjecting the process to fuzzy proportional and integral control based on the estimated variation in the process response output;

wherein said step of estimating a variation in the process response output is executed by estimating, by fuzzy inference, a variation of the process response output occurring upon lapse of the dead time, said variation of the process response output being expressed by a deviation of the process response output upon lapse of the dead time and a variation rate of said deviation; and said step of subjecting the process to fuzzy proportional and integral control utilizes an estimated deviation of the process response output occurring upon lapse of the dead time and an estimated variation rate of said deviation.

2. A method of controlling a process involving a latency or non-response period from a manipulated input variation until observation of an effect thereof appearing as a variation in a process state, said method comprising the steps of:

obtaining input evaluating criteria corresponding to settling values of at least empirically known process response outputs in relation to known input information relating to the process, the input evaluating criteria being represented by at least one of integral, proportional and differential type process responses;

estimating, by fuzzy inference, a control amount relating to the process response output following the dead time on the basis of the value of said input evaluating criteria; and subjecting the process to fuzzy proportional and integral control based on the estimated control amount;

wherein said step of estimating a control amount includes a step of estimating, by fuzzy inference, a first control amount for compensating for a variation of the process response output occurring upon lapse of the dead time in accordance with the value of said input evaluating criterion, and a step of estimating a second control amount for compensating for a current deviation in the process response output by the fuzzy proportional and integral control; and said step of subjecting the process to fuzzy proportional and integral control utilizes estimated values of said first control amount and said second control amount.

3. A control apparatus using fuzzy logic to control a process having a substantial non-response period or dead-time from an input variation applied to the process until an effect resulting from the input variation appears as an output of the process, comprising:

a deviation determining means for determining a difference between a target process output value and an actual process output value;

fuzzy predictor means receiving as inputs the actual process output value, a detected disturbance, a control input signal, and said difference determined by said deviation determining means, for determining an estimated output deviation and a time differential of the estimated output deviation predicted to occur upon elapse of the non-response period;

fuzzy proportional-integral controller means receiving the estimated output deviation and the time differential of the estimated output deviation from said fuzzy predictor means, for determining an estimated control output variation amount;

integrator means receiving said estimated control output variation amount from said fuzzy proportional-integral controller means, for integrating said estimated control output variation amount to produce said control input signal; whereby said control input signal is applied to the process to compensate for a deviation occurring upon elapse of said non-response period.

4. A control apparatus using fuzzy logic as claimed in claim 3, further comprising memory means storing rules for estimating variations in the predicted process output as a function of input variation amount.

5. A control apparatus using fuzzy logic as claimed in claim 3, further comprising memory means storing rules for estimating control input amounts for deviation compensation as a function of said difference between the target process output value and the actual process output value, and wherein said fuzzy proportional-integral controller means operates according to values stored in said memory means when determining the estimated control output variation amount.

6. A control apparatus using fuzzy logic to control a process having a substantial non-response period from a control input variation applied to the process until an effect resulting from the input variation appears as an output of the process, comprising:

a deviation determining means for determining a difference between a target process output value and an actual process output value;

fuzzy proportional-integral controller means receiving the difference between the target process output value and the actual process output value from said deviation determining means, for producing a first estimated control output variation amount;

fuzzy logic compensator means receiving as inputs the actual process output value, a detected disturbance, and a control input signal, for determining a second estimated control output variation amount;

adding means for adding said first and second estimated control output variation amounts to produce a total estimated control output variation amount;

integrator means receiving said estimated control output variation amount from said adding means, for integrating said total estimated control output variation amount from said adding means to produce said control input signal; whereby said control input signal is applied to the process to compensate for a deviation occurring upon elapse of said non-response period.

7. A control apparatus using fuzzy logic as claimed in claim 6, further comprising memory means storing rules for estimating variations in the predicted process output as a function of input variation amount, and wherein said fuzzy logic compensator means operates according to values stored in said memory means when determining the second estimated control output variation amount.

* * * * *